United States Patent
Iwaji et al.

(10) Patent No.: US 8,760,095 B2
(45) Date of Patent: Jun. 24, 2014

(54) ROTATOR CONTROL DEVICE, ROTATOR SYSTEM, VEHICLE, ELECTRIC CAR AND ELECTRIC GENERATION SYSTEM

(75) Inventors: Yoshitaka Iwaji, Hitachinaka (JP); Daigo Kaneko, Hitachi (JP); Kento Mochizuki, Hitachinaka (JP); Takeshi Shinomiya, Hitachinaka (JP); Daisuke Kori, Hitachinaka (JP); Seikichi Masuda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 117 days.

(21) Appl. No.: 13/316,841

(22) Filed: Dec. 12, 2011

(65) Prior Publication Data
US 2012/0146567 A1    Jun. 14, 2012

(30) Foreign Application Priority Data

Dec. 13, 2010   (JP) .................................. 2010-276522

(51) Int. Cl.
  *H02P 6/14*      (2006.01)
(52) U.S. Cl.
  USPC .................. 318/400.26; 318/400.17; 318/434; 318/801; 318/400.21; 323/205; 361/42; 361/63; 361/93.7; 363/51; 363/56.12
(58) Field of Classification Search
  USPC ......... 318/490, 400.06, 434, 801, 400.3, 823; 701/42; 180/446; 361/63, 93.7, 64, 65; 363/54, 56.12, 51
  See application file for complete search history.

(56) References Cited

U.S. PATENT DOCUMENTS

| 5,592,353 | A | * | 1/1997 | Shinohara et al. ............... 361/63 |
| 5,694,010 | A | * | 12/1997 | Oomura et al. .......... 318/400.07 |
| 5,734,256 | A | * | 3/1998 | Larsen et al. .................. 323/207 |
| 5,900,699 | A |   | 5/1999 | Samukawa et al. |
| 6,153,993 | A | * | 11/2000 | Oomura et al. ............... 318/434 |
| 6,278,256 | B1 |   | 8/2001 | Aoyama |

(Continued)

FOREIGN PATENT DOCUMENTS

| JP | 7-59384 A | 3/1995 |
| JP | 8-182105 A | 7/1996 |

(Continued)

OTHER PUBLICATIONS

Japanese-language Office Action dated Apr. 23, 2013 with partial English translation (Four (4) pages).

*Primary Examiner* — Shawki S Ismail
*Assistant Examiner* — Jorge L Carrasquillo
(74) *Attorney, Agent, or Firm* — Crowell & Moring LLP

(57) ABSTRACT

To prevent demagnetization of a permanent magnet synchronous rotating machine, a rotating machine control device according to the present invention is a rotating machine control device comprising: a power converter having a switch part on each of a positive side and a negative side for each phase; and short circuit detection unit for detecting a short circuit of the switch part, wherein a command to turn on positive-side switches and negative-side switches of a plurality of phases of the switch part is issued in the case where the short circuit detection unit detects the short circuit.

22 Claims, 12 Drawing Sheets

(56) References Cited

U.S. PATENT DOCUMENTS

| | | | |
|---|---|---|---|
| 7,609,498 B2 * | 10/2009 | Iimura et al. | 361/93.7 |
| 8,040,081 B2 | 10/2011 | Shimana | |
| 8,232,752 B2 * | 7/2012 | Kezobo et al. | 318/400.06 |
| 2009/0195199 A1 | 8/2009 | Ito | |
| 2010/0017063 A1 * | 1/2010 | Maeda | 701/42 |
| 2010/0036555 A1 | 2/2010 | Hosoda et al. | |
| 2010/0060222 A1 * | 3/2010 | Kezobo et al. | 318/490 |
| 2012/0068644 A1 | 3/2012 | Tsuji | |
| 2012/0145472 A1 * | 6/2012 | Imamura et al. | 180/446 |

FOREIGN PATENT DOCUMENTS

| | | |
|---|---|---|
| JP | 10-12396 A | 1/1998 |
| JP | 2002-339856 A | 11/2002 |
| JP | 2007-189763 A | 7/2007 |
| JP | 2008-54420 A | 3/2008 |
| JP | 2008-220045 A | 9/2008 |
| JP | 2009-195026 A | 8/2009 |
| JP | 2012-65482 A | 3/2012 |

* cited by examiner

ROTATOR CONTROL DEVICE, ROTATOR SYSTEM, VEHICLE, ELECTRIC CAR AND ELECTRIC GENERATION SYSTEM

BACKGROUND OF THE INVENTION

1. Field of the Invention

The present invention relates to a rotating machine control device, a rotating machine system, a vehicle, an electric vehicle, or an electric generation system.

2. Description of the Related Art

A rotating machine is widely used as a motor or an electric generator. In particular, a permanent magnet synchronous rotating machine which is compact and highly efficient is in widespread use in fields from home appliances to industries. In accordance with worldwide trends toward energy conservation and global environmental protection in recent years, an increase in capacity of a permanent magnet synchronous electric motor (and a permanent magnet synchronous electric generator) is being promoted, which leads to applications in systems as large as several hundred kilowatts to several megawatts. New application products include an electric rail car, a wind generation system, and the like.

It is hard to directly drive such a permanent magnet synchronous rotating machine ("rotating machine" mentioned here denotes both an electric motor (motor) and an electric generator) by a commercial power supply, and a power converter, such as an inverter or a converter, needs to be used. The power converter is connected between AC (alternating current) power of the rotating machine and a DC (direct current) power supply for supplying power, and controls the rotating machine. The power converter includes switching elements by semiconductors on positive and negative sides with respect to the DC power supply, where the switching elements are provided according to the number of phases of the rotating machine.

However, in the event that a fault occurs in the power converter itself, the rotating machine connected to the power converter is affected, too. For example, the following patent documents describe techniques in the event of such a power converter fault.

In JP-A-2008-220045, in the event of a power converter fault, in order to protect switching elements other than a damaged switching element, all switching elements on the same polarity side as the faulty switching element are turned on to thereby short-circuit terminals of a rotating machine, thus suppressing an increase in current.

JP-A-2007-189763 describes the following protection method against demagnetization. A blowout of a fuse connected to a DC bus is detected, and then all upper arm switching elements or all lower arm switching elements of a power converter are turned on for protection against irreversible demagnetization.

JP-A-2002-339856 proposes a method of disposing, as an electric brake device of a permanent magnet synchronous electric generator, an external short-circuiting circuit on a connection line of the electric generator.

JP-A-10-12396 describes an overcurrent prevention method when starting inverter driving while a permanent magnet synchronous motor is idling.

However, in the method described in JP-A-2008-220045, based on a premise that the rotating machine has a sufficiently large demagnetization tolerance, current waveforms in the event of a fault are averaged and whether a switching element on the positive or negative side has a short circuit fault is determined before determining which switching elements are to be turned on. Accordingly, a high-density rotating machine designed with a low demagnetization tolerance has a possibility of reaching a demagnetizing current before protection. Hence, it is problematic to directly apply this method to such a rotating machine.

In the method described in JP-A-2007-189763, the fuse needs to be introduced into the DC bus. However, it is difficult to introduce the fuse into a large-capacity converter as large as several hundred to several thousand kilowatts. In particular, since there is a need to reduce a wiring inductance for the DC bus, it is difficult to insert the fuse into the DC bus as in JP-A-2007-189763. Besides, there is also a problem that demagnetization may be caused as a result of an increase in current of the rotating machine during a period before fuse breaking.

In the method described in JP-A-2002-339856, it is possible to suppress an overcurrent by activating the external short-circuiting circuit in the event of a fault, but there is no mention of any means from fault detection to protection.

The method described in JP-A-10-12396 is a measure for preventing demagnetization by a large current in a start sequence, and is based on a premise that the inverter (power converter) is in normal operation. Therefore, an abnormal current in the event of a power converter fault cannot be prevented by this method.

SUMMARY OF THE INVENTION

Thus, well known techniques are willingly disclosed from a viewpoint that contributes to information disclosure, and problems that can be found in the related art for each of the disclosed techniques are mentioned. A direct object of the present invention is to prevent demagnetization of a permanent magnet synchronous rotating machine.

To achieve the stated object, a rotating machine control device according to the present invention is a rotating machine control device comprising: a power converter having a switch part on each of a positive side and a negative side for each phase; and a short circuit detection unit for detecting a short circuit of the switch part, wherein a command to turn on positive-side switches and negative-side switches of a plurality of phases of the switch part is issued in the case where the short circuit detection unit detects the short circuit.

A rotating machine system according to the present invention comprises: a permanent magnet rotating machine including a rotor and a stator positioned in opposition to the rotor with a predetermined gap therebetween, with a permanent magnet being disposed in the rotor; and the rotating machine control device.

An electric vehicle or electric car according to the present invention comprises the rotating machine system and uses the rotating machine as a motor.

An electric generation system according to the present invention comprises the rotating machine system and uses the rotating machine as an electric generator.

According to the present invention, demagnetization of a permanent magnet synchronous rotating machine can be prevented.

Other objects, features and advantages of the invention will become apparent from the following description of the embodiments of the invention taken in conjunction with the accompanying drawings.

DETAILED DESCRIPTION OF THE EMBODIMENTS

The inventors of the present invention have learned the following as a result of study.

There is a case where, during an operation of a permanent magnet synchronous rotating machine, any of switching elements in a power converter has a short circuit fault in which the switching element is continuously in a conducting state despite a control signal of the switching element. Note that, in this specification, a short circuit fault of a switching element means a state where both ends of the switching element are short-circuited to cause a current to flow in both directions.

Switching elements are provided on positive and negative sides with respect to a DC power supply. This being so, even in the case where a short circuit fault occurs in a switching element on one polarity side, an on signal for a normal switching operation is applied to a switching element on the other polarity side, which causes a short circuit of the DC power supply. Due to this DC short circuit, a large current is instantly generated, as a result of which the short-circuited switching element is damaged.

This damage of the switching element by the short circuit current takes place in various forms depending on states (e.g. an element current, an applied voltage, an element temperature, an aged deterioration, a transient phenomenon). These states are classified into the following three patterns.

(A) A situation where a switch is damaged in an open position as switching elements on both of the positive and negative sides break ("open fault" shown in FIG. 19(A)).

(B) A situation where damage occurs in a state where a switching element on one of the positive and negative sides breaks and opens while a switching element on the other polarity side is conducting (fixed state) ("single-side short circuit fault" shown in FIG. 19(B)).

(C) A situation where switching elements on both of the positive and negative sides are conducting (fixed state) ("upper and lower short circuit fault" shown in FIG. 19(C)).

In the event of such faults, the DC power supply significantly decreases at an instant, which is detected as an abnormality of the converter. Typically, gate signals of all switching elements are set to off at this moment (gate suppression).

Figure 5:
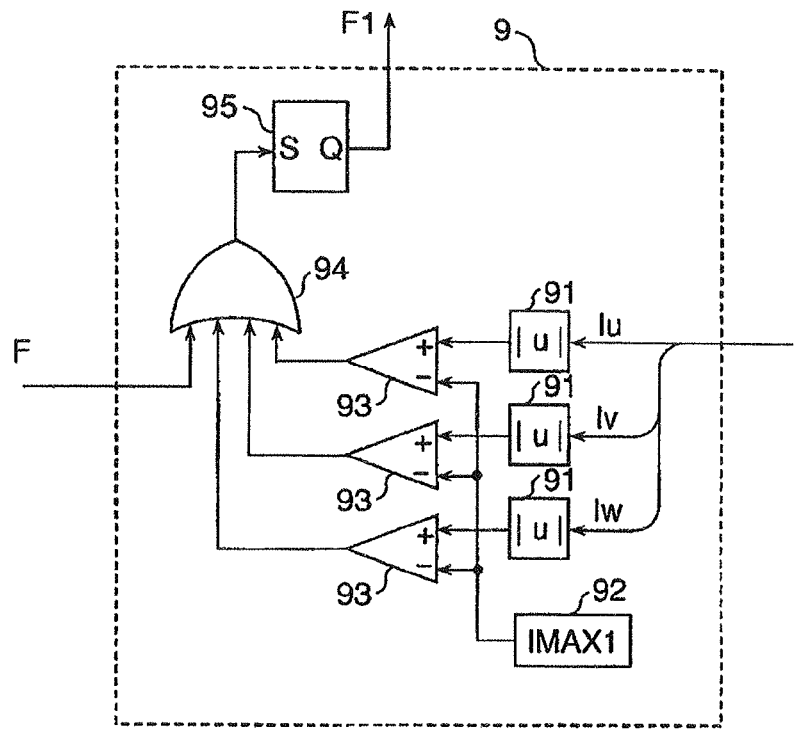
FIG. 5 shows a structure of an abnormality detector 9 (Embodiment 2).
Figure 19:
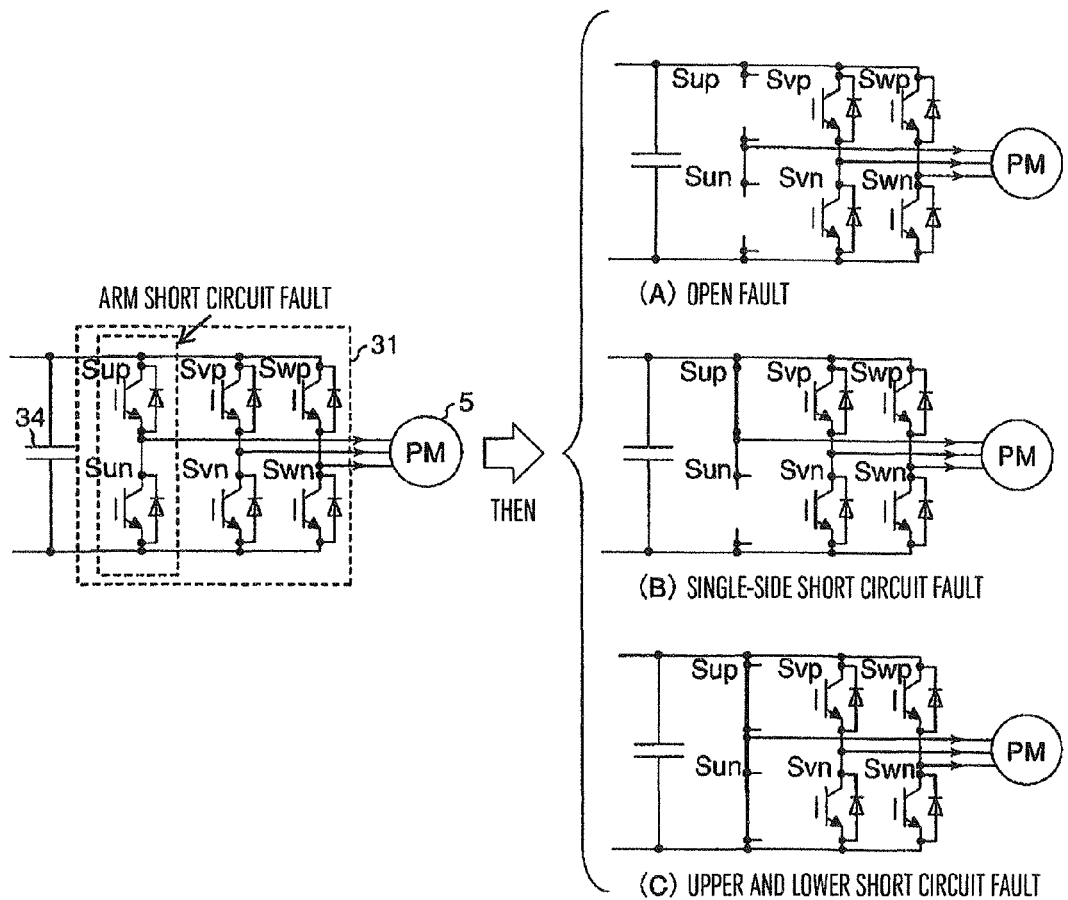
FIG. 19 shows fault states of a switching element of an inverter (description of problem).
Figure 20:
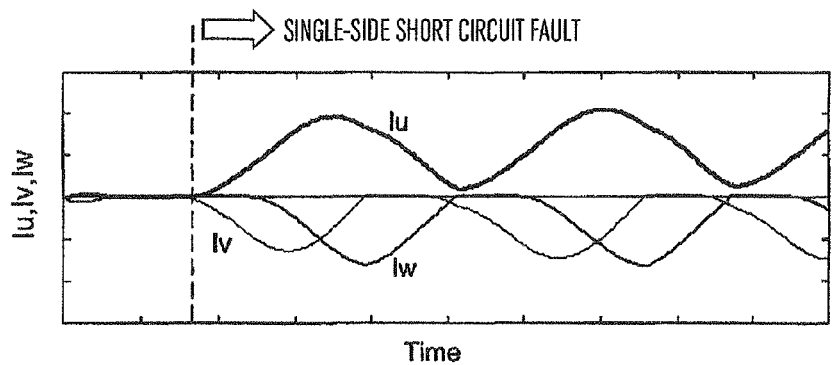
FIG. 20 shows a current waveform in the event of a single-side short circuit fault (description of problem).

FIG. 19 shows the above-mentioned damage states (A) to (C). There is a significant difference in current flowing in the rotating machine, depending on which of these states continues. For example, in the state (A), the current of the rotating machine is interrupted by gate suppression, and therefore decays spontaneously. The state (C) is equivalent to a state where all terminals of the rotating machine are short-circuited, so that a current determined by an impedance of the rotating machine keeps flowing. In the damage state (B), since the switching element on either the positive or negative side is short-circuited, a rectified current obtained by rectifying an electromotive voltage of the rotating machine via a diode (a freewheeling diode connected to a switching element) in the other phases flows. This current has a DC offset. FIG. 20 shows an example of a current waveform of the current (this phenomenon is also shown in FIG. 5 in JP-A-2008-220045). The DC current in the state (B) is determined according to a DC resistance of the rotating machine. That is, when the rotating machine has a small wire resistance, a large current continuously flows by a slight DC voltage. Especially, a rotating machine of several hundred to several thousand kilowatts used in an electric rail car, a wind generator, and the like has a small wire resistance, leading to a large DC offset. This raises a possibility of irreversible demagnetization of a permanent magnet in the rotating machine. Typically, factors responsible for the irreversible demagnetization of the permanent magnet are determined by a temperature condition of the magnet and a density of a magnetic flux produced by a current. Only in the case where the single-side short circuit fault (B) mentioned above occurs in the power converter, there is a possibility that a large current flows in the rotating machine, resulting in irreversible demagnetization. Demagnetization may be prevented on the rotating machine part by increasing a thickness of the magnet itself to thereby attain a larger demagnetization tolerance. This, however, incurs an increase in size of the rotating machine. Besides, it is not preferable, in terms of system structure, to design the rotating machine based on an assumption that a large current which would not flow during actual operation flows.

If demagnetization takes place, an enormous amount of work is required to repair the rotating machine. It is especially hard to replace or repair a large rotating machine as large as several hundred to several thousand kilowatts.

There is also a problem other than demagnetization. When a large current including a DC offset flows, the current itself induces a rotational pulsatory motion (torque variation), causing a machine connected to the rotating machine to vibrate. In the case where the rotating machine is used as an electric generator, a drive source such as a windmill or a diesel engine is exposed to a large mechanical vibration. There is a possibility that the machine is damaged by such a vibration.

In view of the above-mentioned findings, preferred embodiments of the present invention are described below. Note that the following embodiments are merely examples, and the present invention should not be limited to the following embodiments.

Embodiment 1

Figure 1:
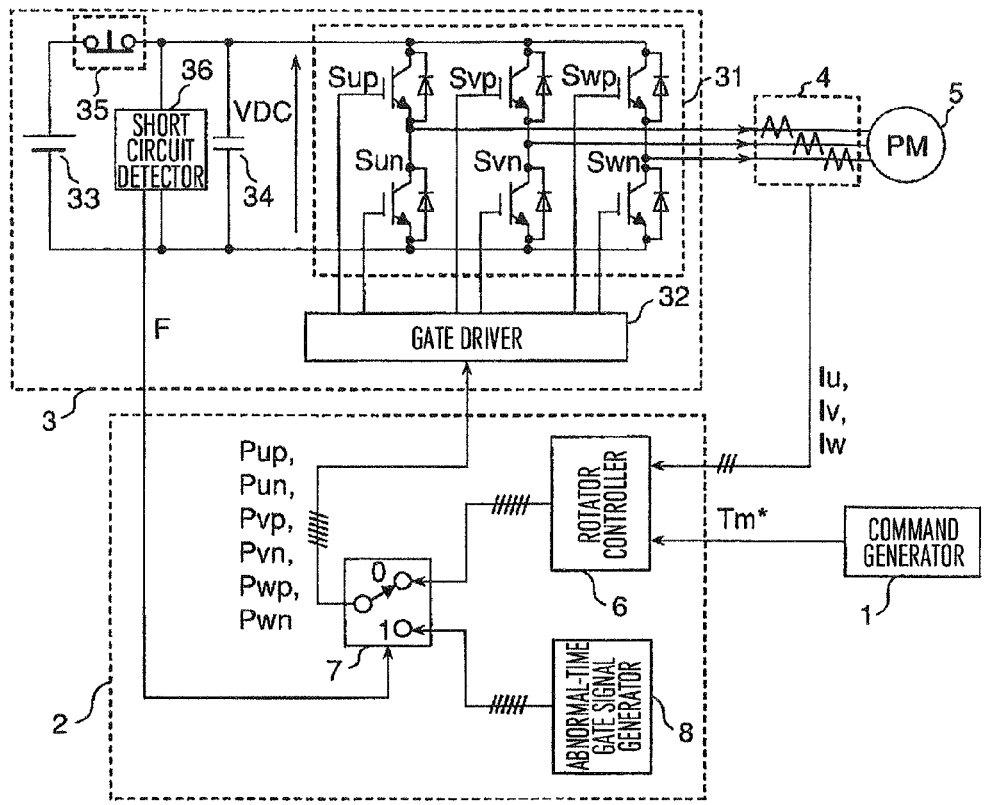
FIG. 1 shows a structure of a motor drive system (Embodiment 1).
Figure 2:
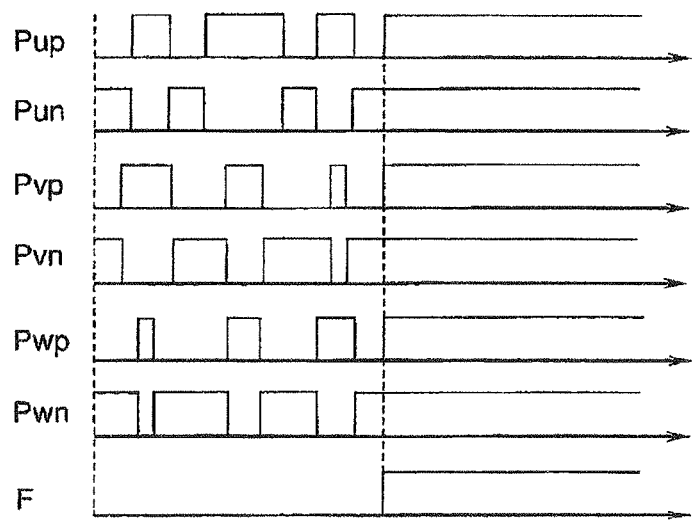
FIG. 2 shows a gate signal 1 of each switching element (Embodiment 1).
Figure 3:
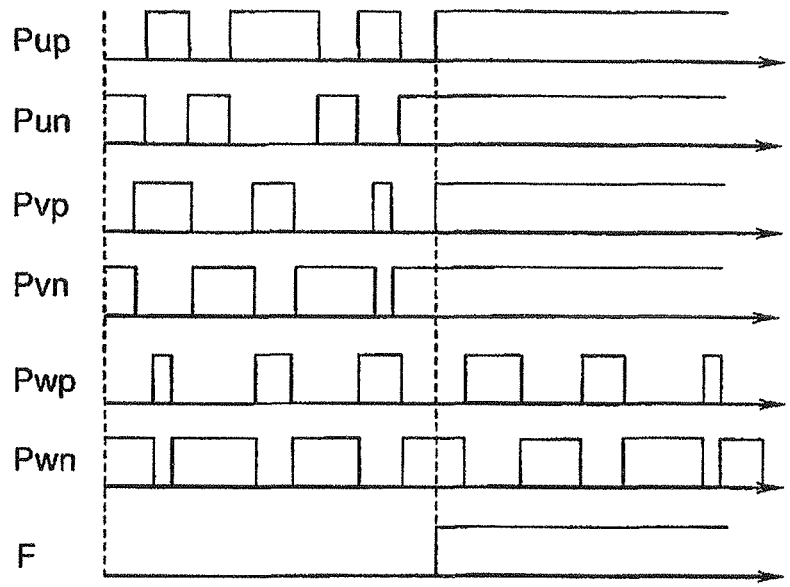
FIG. 3 shows a gate signal 2 of each switching element (Embodiment 1).

The following describes Embodiment 1 of the present invention with reference to FIGS. 1 to 3.

FIG. 1 shows a motor drive system for driving a three-phase permanent magnet motor (hereafter abbreviated as a PM motor) 5 as a permanent magnet synchronous rotating machine. Components shown in FIG. 1 include: a command generator 1 for generating a torque command Tm* of a PM motor 5; a controller 2 for calculating an applied voltage of the PM motor 5 and generating a pulse width modulation (PWM) signal for an inverter; an inverter 3 for generating an AC voltage from a DC power supply upon receiving the PWM signal from the controller 2; and the PM motor 5 controlled by these components.

The inverter 3 includes: an inverter main circuit 31 composed of six switching elements Sup to Swn for performing DC/AC power conversion; an output predriver 32 for directly driving the inverter main circuit 31; a DC power supply 33 for supplying power to the inverter; a smoothing capacitor 34; a DC circuit breaker 35; and a short circuit detector 36 which is a unit for detecting a DC voltage abnormality (short circuit).

The command generator 1 is a controller located at a higher level than the controller 2, and generates the torque command Tm* of the PM motor 5. For example, the higher-level controller may output, as a command, a rotation frequency command in the case of a fan pump system, and an electric power command in the case of an electric generator system. Both commands are applicable.

A rotating machine controller 6 calculates a voltage to be applied to the PM motor 5 based on the higher-level command (the torque command Tm* in FIG. 1) and phase currents Iu, Iv, and Iw of the PM motor 5 detected by a current detector 4 of the PM motor 5, and outputs a PWM (pulse width modulation) signal to cause the inverter 3 to output the calculated voltage, thereby driving the output predriver 32. Though the current detector 4 detects the currents of all three phases in this embodiment, the current detector 4 may instead detect only the currents of two phases and calculate the current of the remaining one phase.

The following describes a gate signal switch 7 and an abnormal-time gate signal generator 8 which are characteristic features in this embodiment. A short circuit is detected by the short circuit detector 36 included in the inverter 3, and a signal indicating the short circuit (a signal "F" in FIG. 1) is output to the gate signal switch 7. Upon receiving the short circuit signal F, the gate signal switch 7 switches from "0" to "1" in FIG. 1. As a result, the signal output to the output predriver 32 is switched from a normal drive signal of the PM motor 5 to a signal generated by the abnormal-time gate signal generator 8.

FIG. 2 shows a situation of this switching. Pup to Pwn which are on signals of the switching elements Sup to Swn of the inverter 3 are all changed to on, when the short circuit signal F becomes "1". As a result, all switching elements other than a damaged switching element are turned on, forcing the inverter main circuit to have a zero DC voltage. By intentionally creating the same upper and lower short circuit state (arm short circuit) as the one shown in FIG. 19(C), an increase in current of the PM motor 5 can be prevented.

Though a large current flows in from the DC power supply 33 of the inverter 3, the DC circuit breaker 35 operates to prevent an increase in current.

It is unlikely that a short circuit fault occurs in a plurality of phases simultaneously. Provided that a short circuit fault occurs in one phase, a short circuit of the DC power supply can be realized by simultaneously turning on upper and lower switching elements of at least two phases. For example, by applying upper and lower on signals only to the two phases of the U and V phases as an abnormal-time switching operation as shown in FIG. 3, a DC short circuit can be created, enabling protection of the PM motor 5 from irreversible demagnetization.

Thus, according to Embodiment 1 of the present invention, even in the case where a short circuit fault occurs in a switching element of the inverter, it is possible to avoid irreversible demagnetization of the PM motor. In the present invention, protection is performed by creating an arm short circuit through the use of switching elements that are in normal operation in the event of an inverter fault. There is a possibility that these switching elements suffer overcurrent damage as a result of such a protective operation. However, it is hard to replace or repair the PM motor (large-capacity PM motor in particular) whereas it is relatively easy to replace the converter itself, as mentioned earlier. In addition, in view of an influence of an excessive current on the entire system, it is preferable to use the inverter main circuit as a protector.

Though the above describes the case where the short circuit detector 36 is a unit for monitoring a DC voltage to detect whether or not a short circuit occurs, other methods, such as a unit for monitoring a switching element terminal voltage or a predriver output to detect a short circuit, are equally applicable.

Embodiment 2

Figure 4:
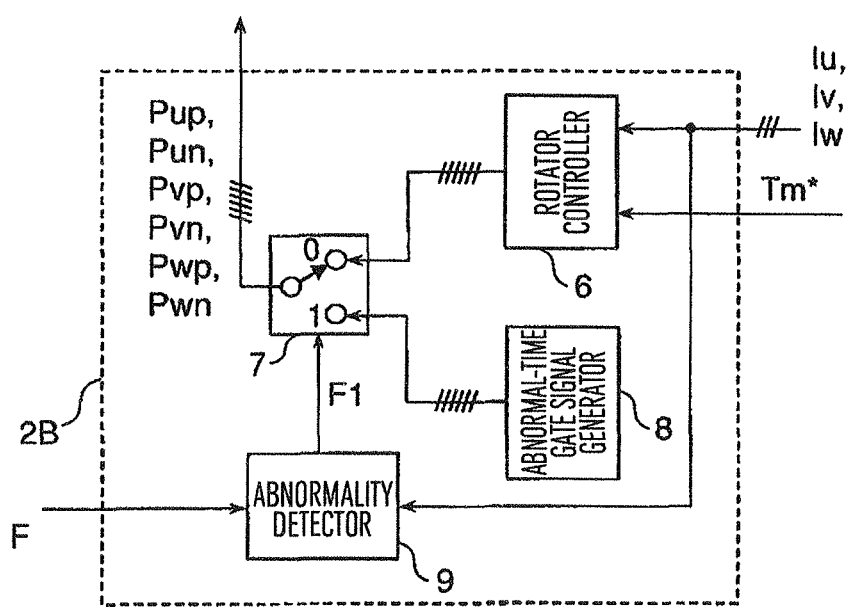
FIG. 4 shows a structure of a controller 2B (Embodiment 2).

The following describes Embodiment 2 of the present invention with reference to FIGS. 4 and 5.

In Embodiment 1, a short circuit fault is detected, and the DC voltage of the inverter is short-circuited based on the fault signal to suppress an excessive current of the PM motor, thereby preventing irreversible demagnetization. Short circuit fault detection reliability is required in such an embodiment. There is a possibility that the short circuit detector 36 malfunctions when increased in sensitivity, and fails to detect a fault when the sensitivity is excessively low. Embodiment 2 is intended to solve this problem. Note that the same description as Embodiment 1 is omitted here.

FIG. 4 shows a controller 2B. In Embodiment 2, the controller 2B is used instead of the controller 2 in Embodiment 1 (FIG. 1).

In FIG. 4, the rotating machine controller 6, the gate signal switch 7, and the abnormal-time gate signal generator 8 are the same as those in FIG. 1. An abnormality detector 9 is a newly added component. FIG. 5 shows a structure of the abnormality detector 9.

In FIG. 5, the abnormality detector 9 includes: absolute value calculators 91 for calculating absolute values of three-phase current detection values; an overcurrent level setter 92 (referred to as IMAX1) for outputting an overcurrent set value (threshold); comparators 93 each for comparing inputs of two input terminals, and outputting "1" (abnormality signal) in the case where a "+" terminal is larger than a "−" terminal and "0" (normality signal) in the case where the "+" terminal is not larger than the "−" terminal; an OR circuit 94 for taking an OR of input signals; and a latch circuit 95 whose output "F1" is set to "1" by a leading edge of an input signal.

This abnormality detector 9 operates as follows.

In the case where the fault signal F is generated from the short circuit detector 36, the signal "1" (abnormality signal) is output from the OR circuit 94, and the output of the latch circuit 95 is set to "1" (abnormality signal), as a result of which the gate signal switch 7 is switched to "1". This operation is the same as that in Embodiment 1.

Apart from this, the detection values of the phase currents Iu, Iv, and Iw of the PM motor 5 are input to the abnormality detector 9, where the absolute value calculators 91 calculate the absolute values of the phase current detection values, and the comparators 93 compare the absolute values of the respective phases with the overcurrent set value IMAX1. IMAX1 is set to be lower than a current value that results in irreversible demagnetization, allowing for a margin of error. In FIG. 5, when any of the phase currents Iu, Iv, and Iw exceeds IMAX1, the output of the OR circuit 94 changes to "1" (abnormality signal), and accordingly F1 changes to "1" (abnormality signal), too.

Thus, while in Embodiment 1 the abnormal state is detected based only on the output of the short circuit detector 36, in Embodiment 2 the abnormal state can be detected by any of the short circuit detection by the short circuit detector 36 and the overcurrent detection by the above-mentioned overcurrent detection unit.

Therefore, according to Embodiment 2, the protective operation can be performed using not only the signal from the short circuit detector 36 but also the magnitude of each phase current. This enables more reliable prevention of irreversible demagnetization of the PM motor.

Though this embodiment describes the case where the overcurrent detection is performed inside the abnormality detector 9, the present invention is not limited to such, and an overcurrent detection signal alone may be input to the abnormality detector 9.

Embodiment 3

Figure 6:
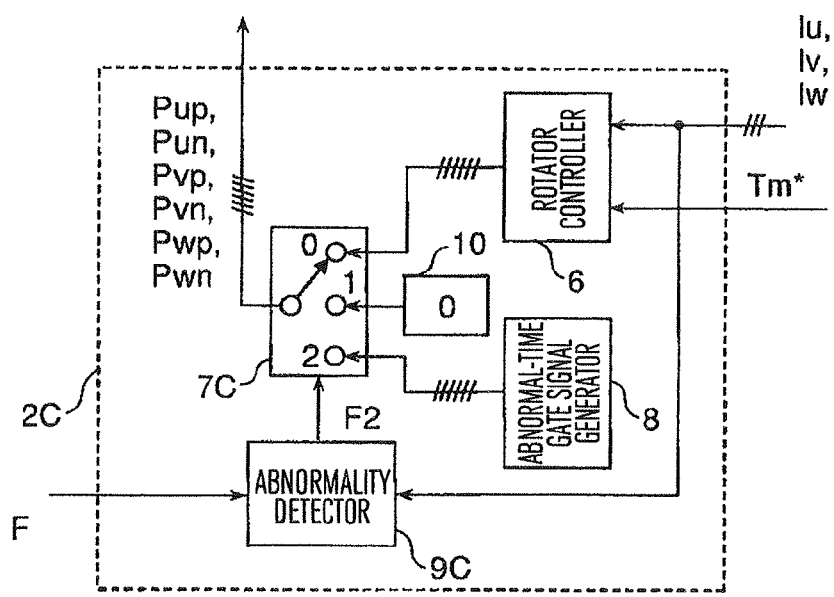
FIG. 6 shows a structure of a controller 2C (Embodiment 3).
Figure 7:
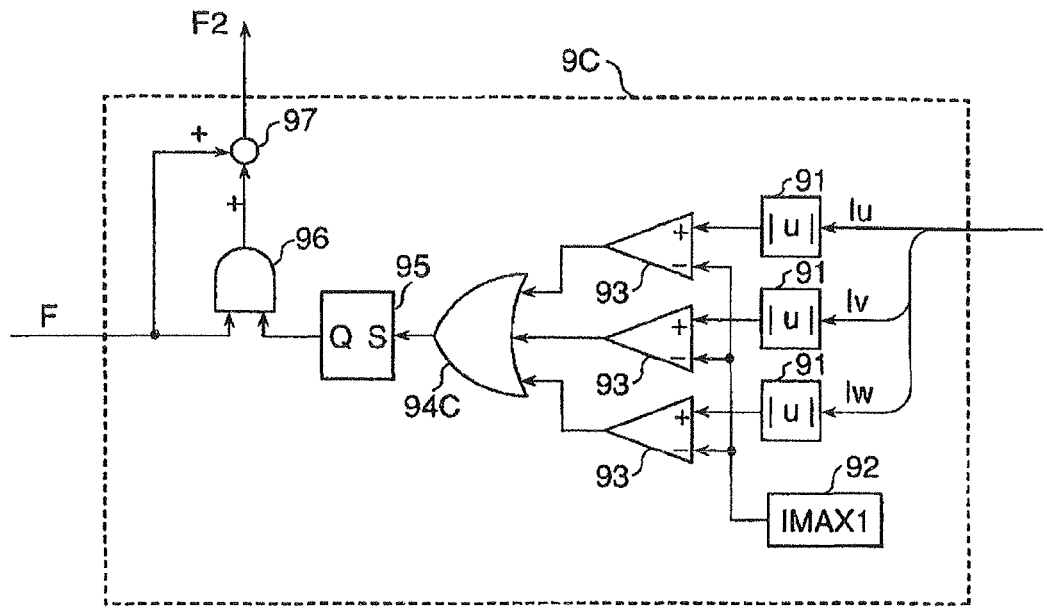
FIG. 7 shows a structure of an abnormality detector 9C (Embodiment 3).
Figure 8:
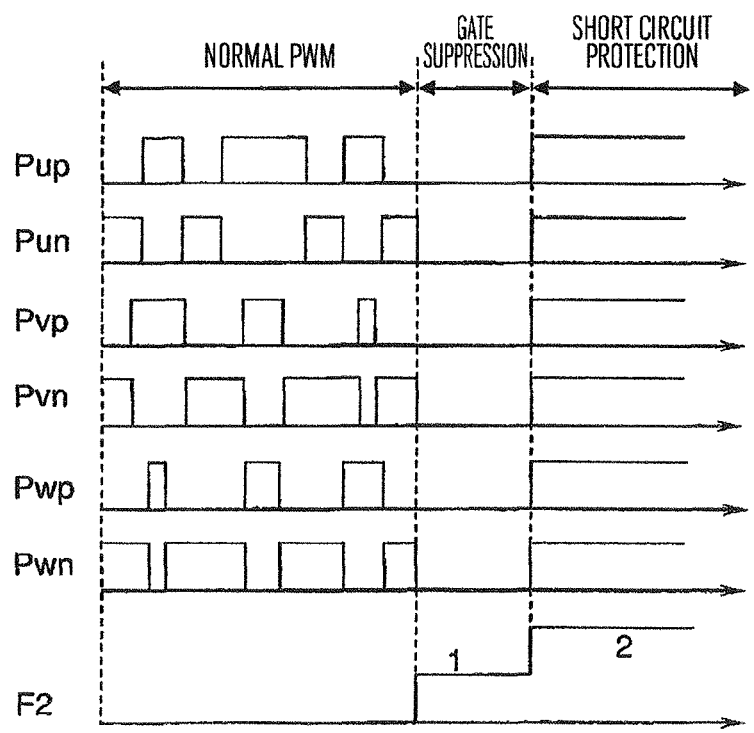
FIG. 8 shows a gate signal of each switching element (Embodiment 3).

The following describes Embodiment 3 of the present invention with reference to FIGS. 6 to 8.

In Embodiment 2, the protective operation upon an inverter fault is performed based on detection of at least one of a short circuit of the DC power supply and an overcurrent of the phase current. This is useful in achieving more reliable protection. However, there is also a possibility that a switching element is damaged by a malfunction. In view of this, in Embodiment 3, the protection against irreversible demagnetization is performed while minimizing an effect of a malfunction or false detection. Note that the same description as each of the above embodiments is omitted here.

FIG. 6 shows a controller 2C. In Embodiment 3, the controller 2C is used instead of the controller 2 in Embodiment 1 (FIG. 1).

In FIG. 6, the rotating machine controller 6 and the abnormal-time gate signal generator 8 are the same as those in FIGS. 1 and 4. A gate signal switch 7C has three contacts "0", "1", and "2", one of which is selected according to a signal "F2". When F2=0 (signal in a normal state), the normal output of the rotating machine controller 6 is sent as a gate signal. When F2=1, all signals are "0" (i.e. a gate suppression state where all switching elements are off). When F2=2, all signals are "1" (i.e. an upper and lower short circuit state where all switching elements are on). An abnormality detector 9C is a newly added block. FIG. 7 shows the abnormality detector 9C in detail.

In FIG. 7, the absolute value calculators 91, the overcurrent level setter 92, the comparators 93, and the latch circuit 95 are the same as those in FIG. 5. An OR circuit 94C is a logical OR circuit having three input terminals respectively connected to the comparators 93. An AND circuit 96 and an adder 97 are newly added.

This abnormality detector 9C operates as follows.

In the case where the signal F from the short circuit detector 36 is "1", the adder 97 outputs "1" (first abnormality signal), which is input to the gate signal switch 7C as a control signal to thereby switch the switch contact to "1". At this time, the gate signals of all switching elements become "0" (off), creating a gate suppression state. If the inverter fault state is as shown in FIG. 19(A) or (C), this state is maintained. In the event of such faults, the PM motor can be kept from irreversible demagnetization, with there being no particular need to create an arm short circuit. In the event of the fault shown in FIG. 19(B), however, the phase current increases as shown in FIG. 20. As a result, when the overcurrent level is reached in one of the three phases, "1" (abnormality signal) is output to the OR circuit 94C from the comparator 93 corresponding to the phase in which the overcurrent level is reached, so that the output of the OR circuit 94C in FIG. 7 changes to "1" (abnormality signal) as in Embodiment 2. In response to this change, the output of the latch circuit 95 changes to "1". Here, since the short circuit detection signal F is "1", the output of the AND circuit 96 is "1", and accordingly the output F2 of the adder 97 changes to "2" (second abnormality signal). Hence, the contact of the gate signal switch 7C is switched to "2", incurring a change from the gate suppression state to the state where all gate signals are on. This results in an upper and lower short circuit of the switching elements.

FIG. 8 shows this situation. The gate signal of each switching element changes from normal PWM to gate suppression (all phases are off) and then to the state where all phases are on, according to F2.

As described above, according to Embodiment 3 of the present invention, the protection can be performed according to the switching element fault state. Even in the case where the short circuit fault signal is falsely detected, the inverter is once stopped in the gate suppression state. This prevents unwanted switching element damage caused by incorrectly creating an arm short circuit. Besides, in a mode other than the single-side short circuit fault shown in FIG. 19(B), even when a fault occurs in a switching element, the inverter can be promptly stopped without the need for an arm short circuit of the DC voltage.

Embodiment 4

The following describes Embodiment 4 of the present invention with reference to FIGS. 9 to 14.

In Embodiment 3, the protective operation is performed according to the inverter fault state. In Embodiment 4, the protective operation is equally performed according to the inverter fault state, but appropriate switching element on/off control for each phase is further conducted to avoid an arm short circuit, while suppressing an overcurrent that results in irreversible demagnetization. In the above embodiments, only the protection by the upper and lower short circuit is possible in the event of the single-side short circuit fault (the fault in FIG. 19(B)). In Embodiment 4, the protection is performed without the upper and lower short circuit. This eliminates the waste of damaging a switching element which is not faulty. Note that the same description as each of the above embodiments is omitted here.

Figure 9:
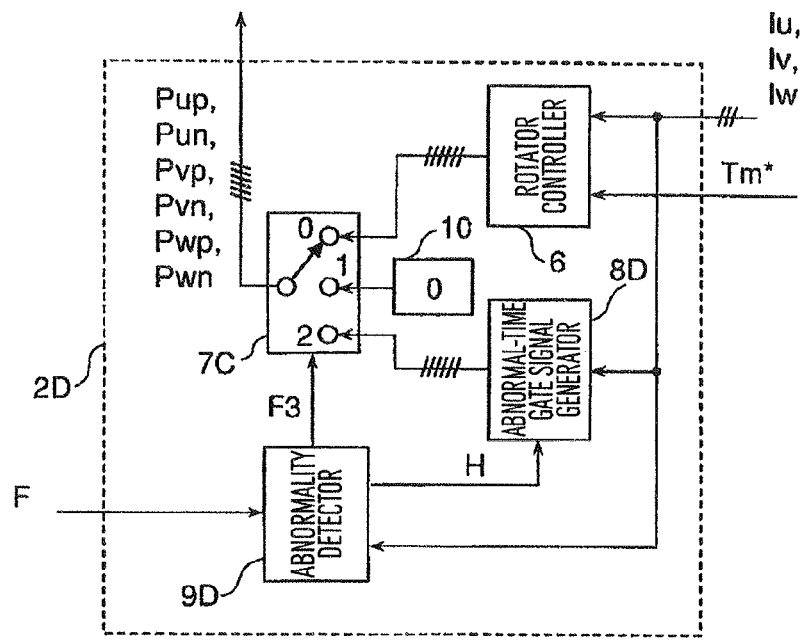
FIG. 9 shows a structure of a controller 2D (Embodiment 4).

FIG. 9 shows a controller 2D. In Embodiment 4, the controller 2D is used instead of the controller 2 in Embodiment 1 (FIG. 1).

Figure 10:
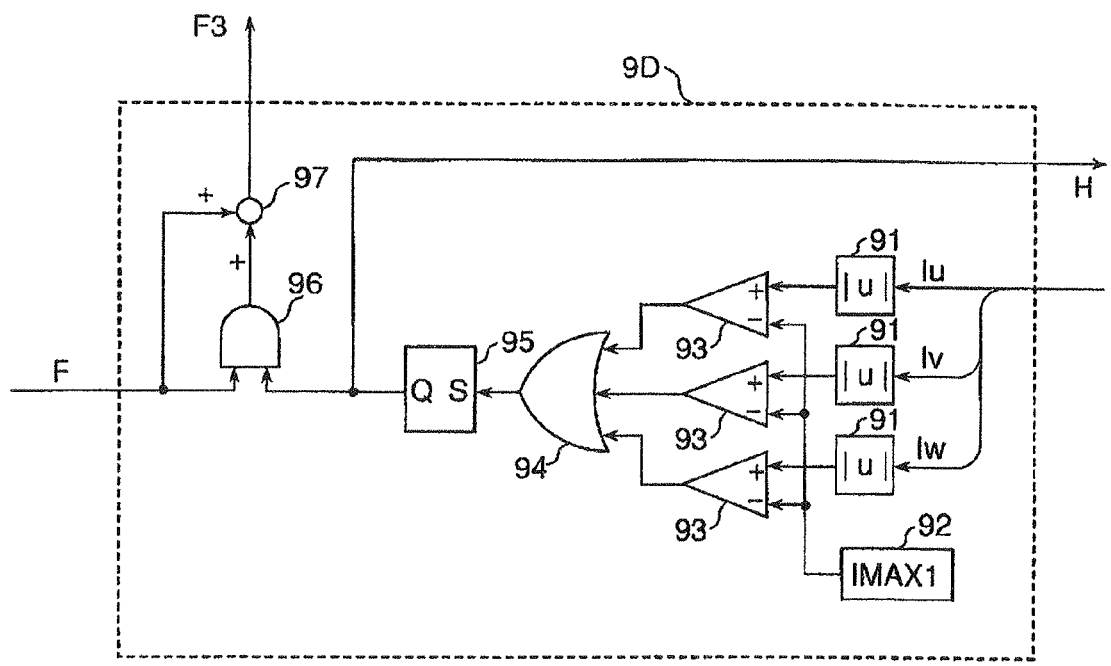
FIG. 10 shows a structure of an abnormality detector 9D (Embodiment 4).
Figure 11:
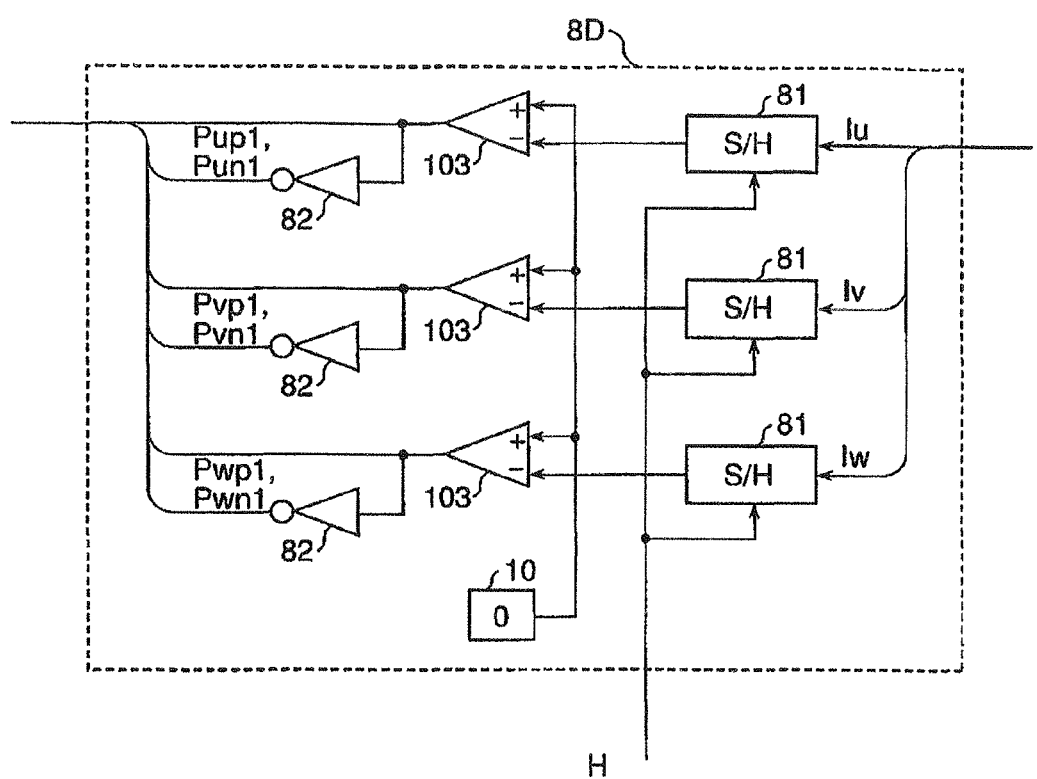
FIG. 11 shows an abnormal-time gate signal generator 8D (Embodiment 4).

In FIG. 9, the rotating machine controller 6, the gate signal switch 7C, and a zero generator 10 are the same as those in Embodiment 3 (FIG. 6). An abnormal-time gate signal generator 8D and an abnormality detector 9D are new blocks. FIGS. 11 and 10 respectively show the abnormal-time gate signal generator 8D and the abnormality detector 9D in detail.

The abnormality detector 9D (FIG. 10) is similar to the abnormality detector 9C (FIG. 7) in Embodiment 3, and only differs in that an output H of the latch circuit 95 is provided to outside. Accordingly, the description of the operation of the abnormality detector 9D is omitted here.

The abnormal-time gate signal generator 8D has a structure shown in FIG. 11. In FIG. 11, the phase current detection values Iu, Iv, and Iw are sampled by sample and hold circuits 81. A timing of sampling is set by the signal H from the abnormality detector 9D. The signal H is a signal generated when any of the three phase currents reaches the overcurrent level. That is, each phase current value at the time when the overcurrent occurs is sampled and held.

Comparators 103 each compare the sampled current value with zero (the output of the zero generator 10), and output "0" when the sampled current value is larger than zero, and "1" when the sampled current value is smaller than zero. These signals from the comparators 103 are directly output as gate signals Pup1, Pvp1, Pwp1 of the upper switching elements of the respective phases, whereas signals obtained by the inverters 82 which invert the signals are output as gate signals Pun1, Pvn1, Pwn1 of the lower switching elements of the respective phases. Thus, the upper and lower arm short circuit state is not created in Embodiment 4.

Figure 12:
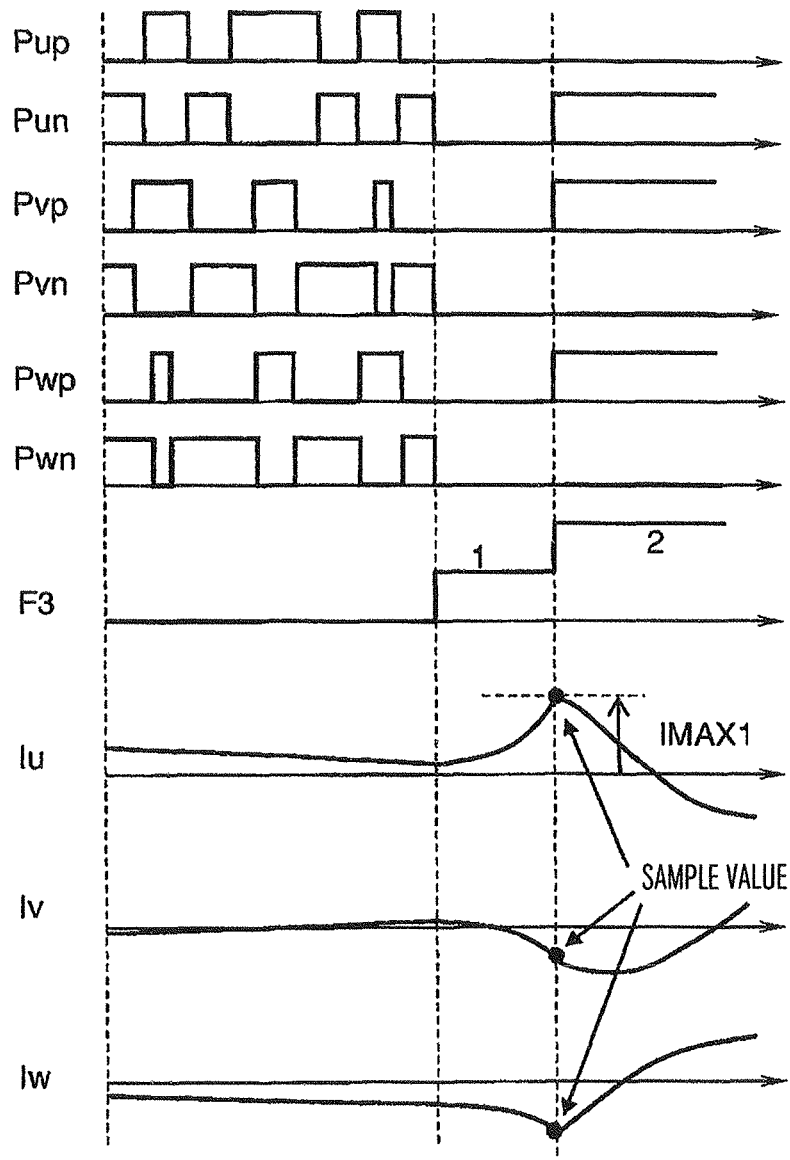
FIG. 12 shows a gate signal and a current waveform of each switching element (Embodiment 4).

FIG. 12 shows operation waveforms. At the time when a short circuit fault is detected and the signal F3 becomes "1", the gate suppression state is created (all switching elements are off). At this time, if the fault state is the open fault (FIG. 19(A)) or the upper and lower short circuit fault (FIG. 19(C)), the gate suppression state is maintained. If the fault state is the single-side short circuit fault (FIG. 19(B)), on the other hand, the phase current starts to increase and eventually the overcurrent level is reached in one of the phases. At the time when the overcurrent is reached, each phase current is sampled and held. This operation is carried out by the sample and hold circuits 81 in FIG. 11. In the example of FIG. 12, Iu reaches the overcurrent, and Iu is held as a positive value while Iv and Iw are held as negative values. The resulting gate signals have waveforms shown as Pup to Pwn in FIG. 12.

Figure 13:
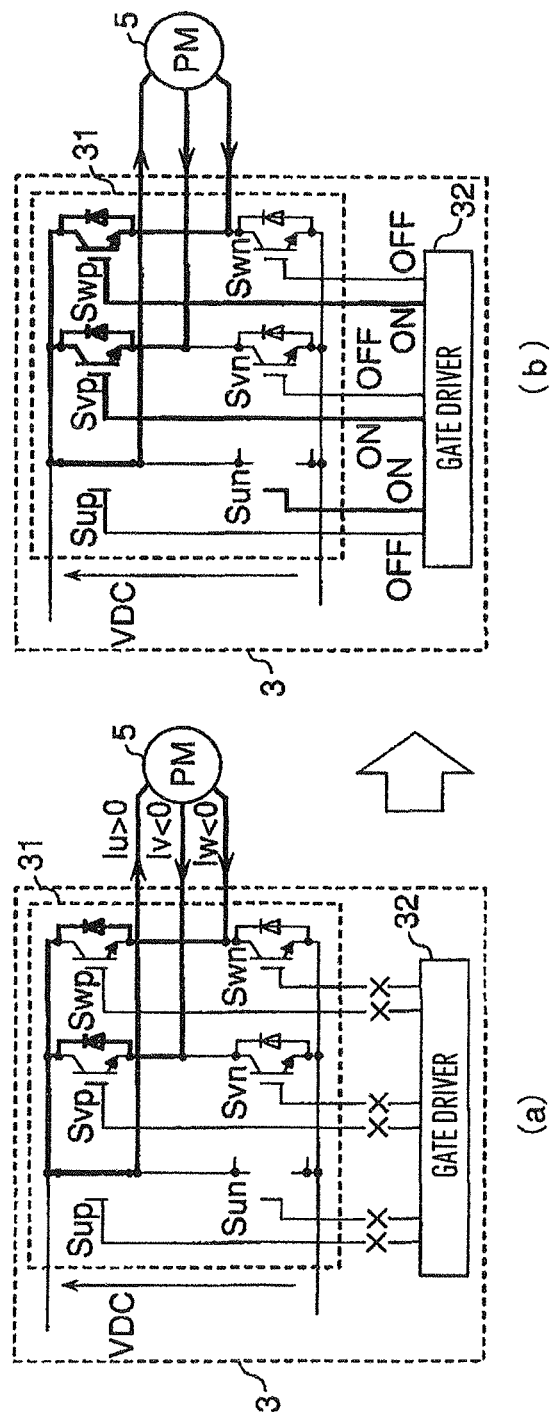
FIG. 13 shows an operation 1 of each switching element (Embodiment 4).
Figure 14:
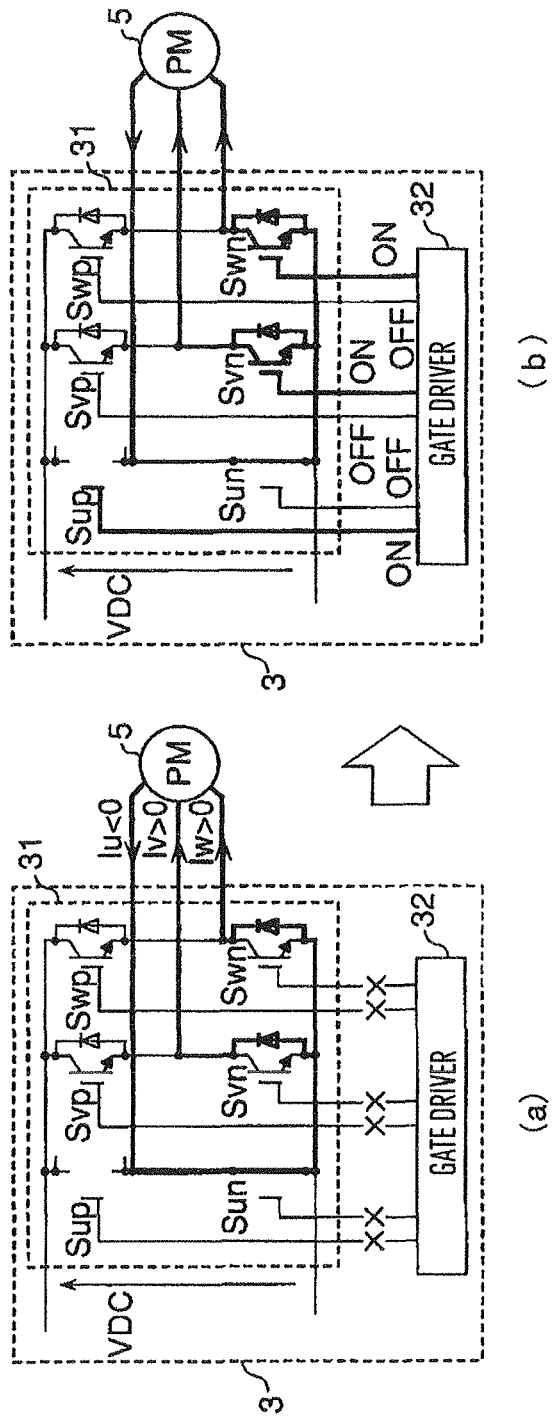
FIG. 14 shows an operation 21 of each switching element (Embodiment 4).

Switching operations by these gate signals can be described using the inverter main circuit as shown in FIG. 13. Suppose the single-side short circuit fault occurs in the upper (positive side) switching element Sup in the U phase. Gate suppression is once created as shown in FIG. 13(a), where all switching elements are off.

However, the switching element Sup alone is conducting because it is in the short circuit fault state. This being so, the current of the PM motor 5 increases in such a manner that Iu increases in a positive direction whereas Iv and Iw increase in a negative direction. Iu eventually reaches the overcurrent level, as a result of which gate signals as shown in FIG. 13(b) are generated (the same state as in FIG. 12). The gate signals for the U phase are to turn on the lower (negative side) switching element Sun and turn off the upper (positive side) switching element Sup. However, the switching element Sun breaks and so cannot be turned on. Meanwhile, the gate signals for the other two normal phases are to turn on the upper (positive side) switching elements Svp and Swp and turn off the lower (negative side) switching elements Svn and Swn, so that the normal upper (positive side) switching elements Svp and Swp are turned on. As a result, all positive-side switching elements, namely, the short circuit faulty switching element Sup and the switching elements Svp and Swp, are conducting. Thus, the terminals of the PM motor 5 are completely short-circuited.

Hence, no phase current DC component is generated, with it being possible to avoid irreversible demagnetization. Moreover, since a short circuit of the upper and lower switching elements is not created either, there is no possibility of damaging a normally operating switching element.

In the event of the single-side short circuit fault where a short circuit fault occurs in the lower switching element, operations from FIG. 14(a) to (b) are performed, enabling a short circuit path to be created using the lower switching elements Sun, Svn, and Swn.

This embodiment is based on a premise that the short circuit fault detection is performed first and then the overcurrent detection is performed. In the case where only an overcurrent is detected, the signal F3 remains "1", so that the gate suppression state is maintained. This poses no problem in terms of false detection prevention. In order to reliably suppress irreversible demagnetization, however, a slight circuit change is necessary. For example, a sequence in which the signal F3 is set to "1" upon detecting a short circuit fault or an overcurrent and, when subsequently detecting an overcurrent again, the signal F3 is set to "2" may be employed. This can be realized by replacing the adder 97, the AND circuit 96, and the latch circuit 95 in FIG. 10 with a counter for counting pulse leading edges and the like and constructing logic so that the signal F3 is output according to the number of short circuit fault detections and overcurrent detections.

As described above, according to Embodiment 4 of the present invention, in the event of an inverter fault, the PM motor can be kept from irreversible demagnetization without damaging a normally operating switching element. In addition, which switching state is appropriate can be determined from the instantaneous value of the current. This can be achieved by an extremely simple processing algorithm.

Embodiment 5

Figure 15:
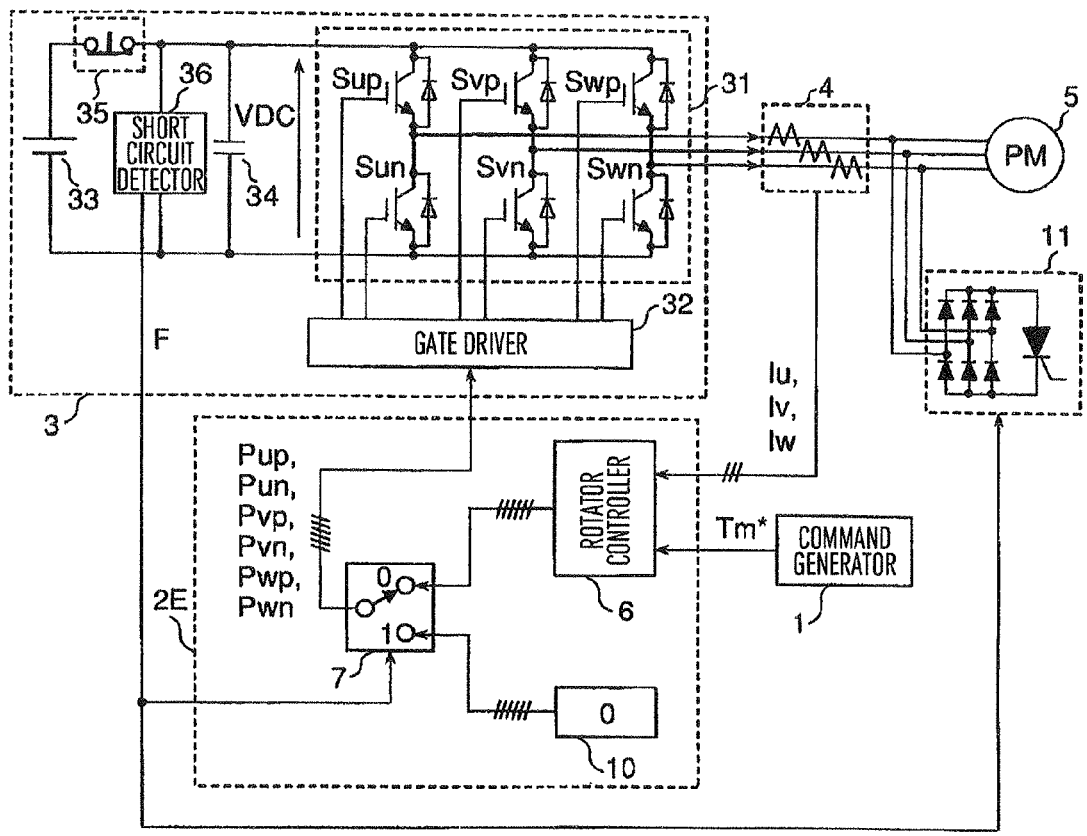
FIG. 15 shows a structure of a motor drive system (Embodiment 5).

The following describes Embodiment 5 of the present invention with reference to FIG. 15.

In Embodiments 1 to 4, the protective function for protecting the PM motor from irreversible demagnetization is realized by the structure of the controller. The protection against demagnetization can be realized simply by signal processing, without specially adding a large component. More reliable protection, however, can be achieved by providing a dedicated rotating machine short-circuiting circuit. Embodiment 5 of the present invention describes an example where an external short-circuiting circuit is provided for protecting the PM motor from irreversible demagnetization. Note that the same description as each of the above embodiments is omitted here.

FIG. 15 shows a motor drive system for driving the PM motor 5. The same components as those in Embodiment 1 shown in FIG. 1 are given the same reference numerals. In FIG. 15, an external short-circuiting circuit 11 is added as a new component, while the other components are the same as those in FIG. 1. A controller 2E operates in the same way as the controller 2, but differs in that gate suppression is selected according to the signal from the zero generator 10 in the case where the short circuit detection signal F is "1". The other operation of the controller 2E is the same as that of the controller 2, and so its description is omitted here.

The short circuit detection signal F is input to the external short-circuiting circuit 11, and the external short-circuiting circuit 11 short-circuits the connection line of the PM motor 5 when F=1 (fault occurrence). The external short-circuiting circuit 11 is a short-circuiting circuit composed of a diode rectifier and a thyristor switch, but any other structure is possible so long as it is an element capable of instantaneously short-circuiting three phases. The term "instantaneous" used here depends on a transient phenomenon of the phase current of the PM motor 5, and is of the order of several ms to several ten ms.

According to the structure shown in FIG. 15, in the event of an inverter fault, the inverter main circuit is put into gate suppression and, even when the fault state is the single-side short circuit fault, irreversible demagnetization can be avoided by short-circuiting the terminals of the PM motor 5 by the external short-circuiting circuit 11.

Here, the signals F1 to F3 of the other controllers (the controllers 2B to 2D) in the above embodiments may be used as the signal for turning on the external short-circuiting circuit 11. That is, the external short-circuiting circuit 11 may be turned on in the case where at least one of the short circuit detection signal F and the overcurrent detection signal is detected. For example, irreversible demagnetization can be prevented even by a structure in which the external short-circuiting circuit 11 is turned on when F2=2.

Other Embodiments

Various other examples where the present invention can be implemented are described below.

Figure 16:
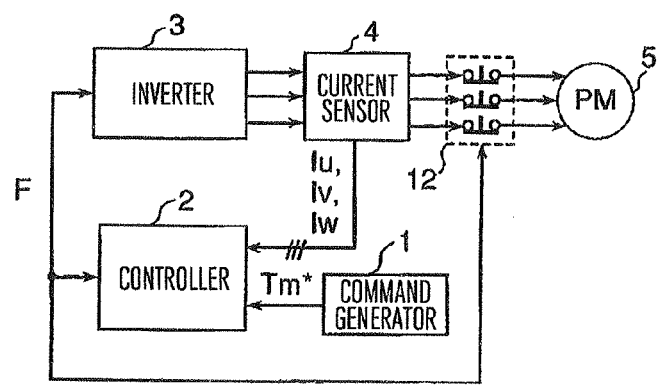
FIG. 16 shows a structure of a motor drive system (other embodiment).

FIG. 16 shows a structure of a motor drive system similar to that shown in FIG. 1 or 15. In a large-capacity PM motor (PM generator), a breaker 12 is inserted before the rotating machine. In the event of a fault, a sequence of opening (off) the breaker 12 is simultaneously performed. However, an operation of a large-capacity breaker is typically very slow, requiring about 0.1 [s]. Meanwhile, an abnormal current of the PM motor rapidly increases due to a transient phenomenon determined by an electric time constant of the motor. Hence, it can be expected that irreversible demagnetization occurs before the breaker 12 is turned off. Therefore, the embodiments described above are implemented before the breaker 12 shown in FIG. 16 is turned off. Particularly in Embodiments 1 to 3, the upper and lower short circuit state of the inverter is maintained to suppress an excessive current of the PM motor during a period until the breaker is turned off.

Figure 17:
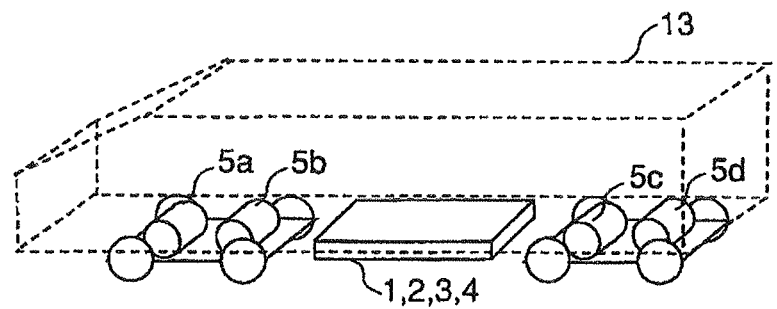
FIG. 17 shows an electric rail car (other embodiment).

FIG. 17 shows an example where the present invention is applied to an electric rail car. The components 1 to 4 and PM motors 5a to 5d constituting a motor drive system are installed in a rail vehicle body 13. An inverter fault can occur in a rail vehicle, too. When this happens, if the PM motor is irreversibly demagnetized, an extensive replacement work becomes necessary. On the other hand, since the inverter is an electric part, it can be repaired merely by replacing a power converter panel. Moreover, it is preferable to make the motor size as small as possible because smaller and lighter motors allow a weight reduction of the vehicle. By introducing the irreversible demagnetization prevention measure according to the present invention, the demagnetization tolerance can be minimized, contributing to a smaller motor size.

Figure 18:
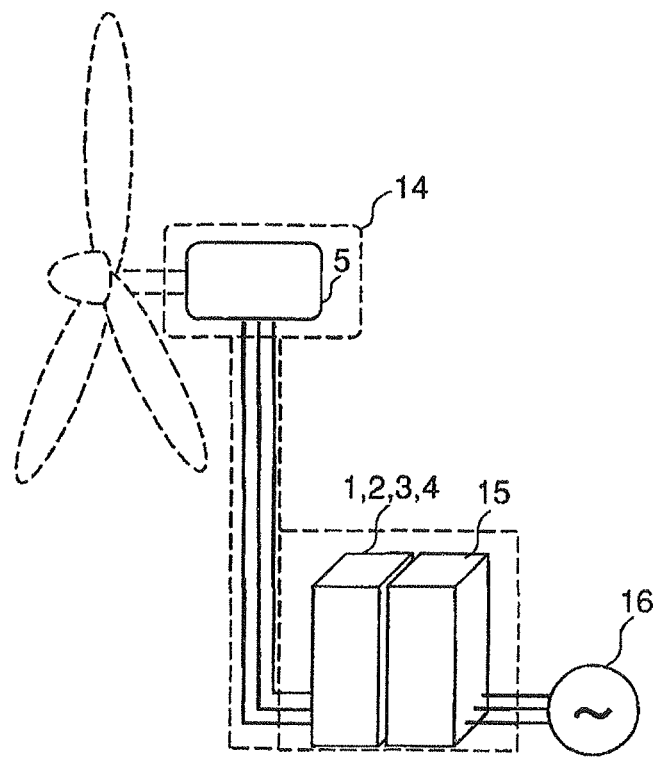
FIG. 18 shows a wind generation system (other embodiment).

FIG. 18 shows an example where the present invention is applied to a wind generation system. FIG. 18 shows a whole wind generation system 14. The components 1 to 5 are the same as the components described above. A component 15 is a converter for generating commercial-frequency AC from DC, and is a circuit for feeding wind-generated energy to an electric power system 16. The DC power supply 33 in the inverter 3 corresponds to the converter 15.

There is a case where a permanent magnet synchronous electric generator as large as several thousand kilowatts is used in wind generation, making it significant to protect against irreversible demagnetization. Since the generator is located near a windmill as shown in FIG. 18, it is hard to repair the generator in the event of a fault. By employing the irreversible demagnetization prevention measure according to the present invention, however, such a replacement or repair work can be saved.

The present invention is also applicable to other products using permanent magnet synchronous rotating machines, such as an electric vehicle, an engine generation system, and so on.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotating machine control device comprising:
a power converter having a switch part on each of a positive side and a negative side for each phase;
a short circuit detection unit for detecting a short circuit of the switch part,
wherein a command to turn on positive-side switches and negative-side switches of a plurality of phases of the switch part is issued in the case where the short circuit detection unit detects the short circuit;
an overcurrent detection unit for detecting an overcurrent of a rotating machine; and
an abnormality detector to which a signal from the short circuit detection unit is input,
wherein the abnormality detector issues the command to turn on the positive-side switches and the negative-side switches of the plurality of phases of the switch part, and
wherein the abnormality detector issues the command to turn on the positive-side switches and the negative-side switches of the plurality of phases of the switch part, in the case where the signal from the short circuit detection unit is input to the abnormality detector or the overcurrent of the rotating machine is detected,
wherein the abnormality detector includes:
an overcurrent level setter for determining an overcurrent threshold;
a comparator for comparing a phase current of the rotating machine with the overcurrent threshold and, in the case where the phase current is larger than the threshold, detecting the overcurrent of the rotating machine and outputting an abnormality signal; and
an OR circuit for outputting an abnormality signal in the case where the abnormality signal from the comparator or the signal from the short circuit detection unit is input to the OR circuit, and
wherein the abnormality detector issues the command to turn on the positive-side switches and the negative-side switches of the plurality of phases of the switch part in the case where the signal from the short circuit detection unit is input to the abnormality detector or the overcurrent of the rotating machine is detected, by the OR circuit outputting the abnormality signal.

2. The rotating machine control device according to claim 1, wherein the abnormality detector issues a command to turn on positive-side switches and negative-side switches of all three phases.

3. A rotating machine system comprising:
a permanent magnet rotating machine including a rotor and a stator positioned in opposition to the rotor with a predetermined gap therebetween, with a permanent magnet being disposed in the rotor; and
the rotating machine control device according to claim 1.

4. The rotating machine system according to claim 3, comprising a breaker between the rotating machine and the rotating machine control device,
wherein the command to turn on the positive-side switches and the negative-side switches of the plurality of phases of the switch part is issued before a breaking operation of the breaker is completed.

5. An electric vehicle or electric car that comprises the rotating machine system according to claim 3 and uses the rotating machine as a motor.

6. An electric generation system that comprises the rotating machine system according to claim 3 and uses the rotating machine as an electric generator.

7. The rotating machine control device according to claim 1, wherein a short-circuiting switch is further provided in a wiring part connecting the power converter to the rotating machine, the short-circuiting switch being capable of short-circuiting all wires of the wiring part, and
wherein the short-circuiting switch short-circuits all of the wires in the case where the signal from the short circuit detection unit is input to the short-circuiting switch or the overcurrent of the rotating machine is detected.

8. A rotating machine control device comprising:
a power converter having a switch part on each of a positive side and a negative side for each phase;
a short circuit detection unit for detecting a short circuit of the switch part,
wherein a command to turn on positive-side switches and negative-side switches of a plurality of phases of the switch part is issued in the case where the short circuit detection unit detects the short circuit;
an overcurrent detection unit for detecting an overcurrent of a rotating machine; and
an abnormality detector to which a signal from the short circuit detection unit is input,
wherein the abnormality detector issues the command to turn on the positive-side witches and the negative-side switches of the plurality of phases of the switch part,
wherein the abnormality detector issues a command to turn off the positive-side switches and the negative-side switches of the plurality of phases of the switch part in the case where either the signal from the short circuit detection unit is input to the abnormality detector or the overcurrent of the rotating machine is detected, and issues the command to turn on the positive-side switches and the negative-side switches of the plurality of phases of the switch part in the case where the signal from the short circuit detection unit is input to the abnormality detector and also the overcurrent of the rotating machine is detected,
wherein the abnormality detector includes:
an overcurrent level setter for determining an overcurrent threshold;
a comparator for comparing a phase current of the rotating machine with the overcurrent threshold and, in the case where the phase current is larger than the threshold, detecting the overcurrent of the rotating machine and outputting an abnormality signal;
an OR circuit for outputting an abnormality signal in the case where the abnormality signal from the comparator is input to the OR circuit;
an AND circuit for outputting an abnormality signal in the case where both the abnormality signal from the OR circuit and the signal from the short circuit detection unit are input to the AND circuit;
and an adder to which the signal from the AND circuit and the signal from the short circuit detection unit are input,
wherein the adder outputs a first abnormality signal in the case where either the signal from the short circuit detection unit is input to the adder or the overcurrent of the rotating machine is detected, and outputs a second abnormality signal in the case where the signal from the short circuit detection unit is input to the adder and also the overcurrent of the rotating machine is detected, and
wherein the abnormality detector issues the command to turn off the positive-side switches and the negative-side switches of the plurality of phases of the switch part in the case where the adder outputs the first abnormality signal, and issues the command to turn on the positive-side switches and the negative-side switches of the plurality of phases of the switch part in the case where the adder outputs the second abnormality signal.

9. The rotating machine control device according to claim 8, wherein the abnormality detector issues a command to turn on positive-side switches and negative-side switches of all three phases.

10. A rotating machine system comprising:
a permanent magnet rotating machine including a rotor and a stator positioned in opposition to the rotor with a predetermined gap therebetween, with a permanent magnet being disposed in the rotor; and
the rotating machine control device according to claim 8.

11. The rotating machine system according to claim 10, comprising
a breaker between the rotating machine and the rotating machine control device,
wherein the command to turn on the positive-side switches and the negative-side switches of the plurality of phases of the switch part is issued before a breaking operation of the breaker is completed.

12. An electric vehicle or electric car that comprises the rotating machine system according to claim 10 and uses the rotating machine as a motor.

13. An electric generation system that comprises the rotating machine system according to claim 10 and uses the rotating machine as an electric generator.

14. The rotating machine control device according to claim 8, wherein a short-circuiting switch is further provided in a wiring part connecting the power converter to the rotating machine, the short-circuiting switch being capable of short-circuiting all wires of the wiring part, and
wherein the short-circuiting switch short-circuits all of the wires in the case where the signal from the short circuit detection unit is input to the short-circuiting switch or the overcurrent of the rotating machine is detected.

15. A rotating machine control device comprising:
a power converter having a switch part on each of a positive side and a negative side for each phase;
an overcurrent detection unit for detecting an overcurrent of a rotating machine;
a short circuit detection unit for detecting a short circuit of the switch part; and an abnormality detector to which a signal from the short circuit detection unit is input, wherein the abnormality detector issues a command to turn off positive-side switches and negative-side switches of three phases of the switch part in the case where the signal from the short circuit detection unit is input to the abnormality detector and the overcurrent of the rotating machine is not detected, and issues a command to transmit a signal from an abnormal-time gate signal generator to the positive-side switches and the negative-side switches of the three phases of the switch part in the case where the signal from the short circuit detection unit is input to the abnormality detector and also the overcurrent of the rotating machine is detected, and wherein the abnormal-time gate signal generator outputs a signal to turn off a positive-side switch and turn on a negative-side switch for each phase in which a phase current of the rotating machine at a time when the overcurrent of the rotating machine is detected is positive, and outputs a signal to turn on the positive-side switch and turn off the negative-side switch for each phase in which the phase current of the rotating machine at the time when the overcurrent of the rotating machine is detected is negative.

16. A rotating machine system comprising:
a permanent magnet rotating machine including a rotor and a stator positioned in opposition to the rotor with a predetermined gap therebetween, with a permanent magnet being disposed in the rotor; and
the rotating machine control device according to claim 15.

17. The rotating machine system according to claim 16, comprising a breaker between the rotating machine and the rotating machine control device, wherein the command to turn on the positive-side switches and the negative-side switches of the plurality of phases of the switch part is issued before a breaking operation of the breaker is completed.

18. The rotating machine control device according to claim 15, wherein the abnormality detector includes:
an overcurrent level setter for determining an overcurrent threshold;
a comparator for comparing the phase current of the rotating machine with the overcurrent threshold and, in the case where the phase current is larger than the threshold, detecting the overcurrent of the rotating machine and outputting an abnormality signal;
an OR circuit for outputting an abnormality signal in the case where the abnormality signal from the comparator is input to the OR circuit;
an AND circuit for outputting an abnormality signal in the case where both the abnormality signal from the OR circuit and the signal from the short circuit detection unit are input to the AND circuit; and
an adder to which the signal from the AND circuit and the signal from the short circuit detection unit are input,
wherein the adder outputs a first abnormality signal in the case where either the signal from the short circuit detection unit is input to the adder or the overcurrent of the rotating machine is detected, and outputs a second abnormality signal in the case where the signal from the short circuit detection unit is input to the adder and also the overcurrent of the rotating machine is detected,
wherein the abnormality detector issues the command to turn off the positive-side switches and the negative-side switches of the three phases of the switch part in the case where the adder outputs the first abnormality signal, and issues the command to transmit the signal from the abnormal-time gate signal generator to the positive-side switches and the negative-side switches of the three phases of the switch part in the case where the adder outputs the second abnormality signal, and
wherein the abnormality signal from the OR circuit is input to the abnormal-time gate signal generator, and the abnormal-time gate signal generator holds a current of each phase of the rotating machine at a time when the abnormality signal from the OR circuit is input to the abnormal-time gate signal generator and then determines a polarity of the current, and outputs the signal to turn off the positive-side switch and turn on the negative-side switch for each phase in which the phase current is positive, and outputs the signal to turn on the positive-side switch and turn off the negative-side switch for each phase in which the phase current is negative.

19. An electric vehicle or electric car that comprises the rotating machine system according to claim 16 and uses the rotating machine as a motor.

20. An electric generation system that comprises the rotating machine system according to claim 16 and uses the rotating machine as an electric generator.

21. A rotating machine control device comprising:
a power converter having a switch part on each of a positive side and a negative side for each phase; and
a short circuit detection unit for detecting a short circuit of the switch part,
wherein a command to turn on positive-side switches and negative-side switches of a plurality of phases of the switch part is issued in the case where the short circuit detection unit detects the short circuit
an overcurrent detection unit for detecting an overcurrent of a rotating machine; and
an abnormality detector to which a signal from the short circuit detection unit is input,
wherein the abnormality detector issues the command to turn on the positive-side switches and the negative-side switches of the plurality of phases of the switch part,
wherein a short-circuiting switch is further provided in a wiring part connecting the power converter to the rotating machine, the short-circuiting switch being capable of short-circuiting all wires of the wiring part, and
wherein the short-circuiting switch short-circuits all of the wires in the case where the signal from the short circuit detection unit is input to the short-circuiting switch or the overcurrent of the rotating machine is detected,
wherein the abnormality detector includes:
an overcurrent level setter for determining an overcurrent threshold; a comparator for comparing a phase current of the rotating machine with the overcurrent threshold and, in the case where the phase current is larger than the threshold, detecting the overcurrent of the rotating machine and outputting an abnormality signal; and
an OR circuit for outputting an abnormality signal in the case where the abnormality signal from the comparator or the signal from the short circuit detection unit is input to the OR circuit, and
wherein the abnormality detector issues the command to turn on the positive-side switches and the negative-side switches of the plurality of phases of the switch part in the case where the signal from the short circuit detection unit is input to the abnormality detector or the overcurrent of the rotating machine is detected, by the OR circuit outputting the abnormality signal.

22. A rotating machine control device, comprising:

a power converter having a switch part on each of a positive side and a negative side for each phase; and a short circuit detection unit for detecting a short circuit of the switch part, wherein a command to turn on positive-side switches and negative-side switches of a plurality of phases of the switch part is issued in the case where the short circuit detection unit detects the short circuit an overcurrent detection unit for detecting an overcurrent of a rotating machine; and an abnormality detector to which a signal from the short circuit detection unit is input, wherein the abnormality detector issues the command to turn on the positive-side switches and the negative-side switches of the plurality of phases of the switch part, wherein a short-circuiting switch is further provided in a wiring part connecting the power converter to the rotating machine, the short-circuiting switch being capable of short-circuiting all wires of the wiring part, and wherein the short-circuiting switch short-circuits all of the wires in the case where the signal from the short circuit detection unit is input to the short-circuiting switch or the overcurrent of the rotating machine is detected, wherein the abnormality detector includes:

an overcurrent level setter for determining an overcurrent threshold;

a comparator for comparing a phase current of the rotating machine with the overcurrent threshold and, in the case where the phase current is larger than the threshold, detecting the overcurrent of the rotating machine and outputting an abnormality signal;

an OR circuit for outputting an abnormality signal in the case where the abnormality signal from the comparator is input to the OR circuit;

an AND circuit for outputting an abnormality signal in the case where both the abnormality signal from the OR circuit and the signal from the short circuit detection unit are input to the AND circuit; and an adder to which the signal from the AND circuit and the signal from the short circuit detection unit are input, wherein the adder outputs a first abnormality signal in the case where either the signal from the short circuit detection unit is input to the adder or the overcurrent of the rotating machine is detected, and outputs a second abnormality signal in the case where the signal from the short circuit detection unit is input to the adder and also the overcurrent of the rotating machine is detected, and wherein the abnormality detector issues the command to turn off the positive-side switches and the negative-side switches of the plurality of phases of the switch part in the case where the adder outputs the first abnormality signal, and issues the command to turn on the positive-side switches and the negative-side switches of the plurality of phases of the switch part in the case where the adder outputs the second abnormality signal.

* * * * *